United States Patent [19]

Nilsson

[11] 3,892,474
[45] July 1, 1975

[54] OPTICAL WEAPON SIGHT HAVING CONTROLLED UNIVERSALLY MOVEABLE MIRROR

[75] Inventor: Hans Arne Ingvar Nilsson, Jönköping, Sweden

[73] Assignee: Saab-Scania Aktiebolag, Linkoping, Sweden

[22] Filed: Nov. 8, 1973

[21] Appl. No.: 413,832

[30] Foreign Application Priority Data
Nov. 13, 1972 Sweden.............................. 14679/72

[52] U.S. Cl................................ 356/252; 356/147
[51] Int. Cl. ........................................... G01n 21/00
[58] Field of Search .......... 356/252, 251, 347, 138, 356/140, 148, 149, 147

[56] References Cited
UNITED STATES PATENTS

| | | | |
|---|---|---|---|
| 2,692,435 | 10/1954 | Wilkenson et al. ................. | 356/252 |
| 2,705,371 | 4/1955 | Hammond ........................... | 356/252 |
| 2,752,684 | 7/1956 | Bentley et al....................... | 356/252 |
| 2,887,927 | 5/1959 | Newton............................... | 356/252 |
| 2,902,764 | 9/1959 | Metallo................................ | 356/252 |
| 2,957,384 | 10/1960 | Raninen............................... | 356/252 |
| 2,979,711 | 4/1961 | Shelley................................ | 356/252 |
| 3,018,476 | 1/1962 | Powley et al. ...................... | 356/252 |
| 3,438,712 | 4/1969 | Meltzer............................... | 356/147 |

*Primary Examiner*—James W. Lawrence
*Assistant Examiner*—B. C. Anderson

[57] ABSTRACT

A gimbal mounted mirror, universally tiltable about coplanar coordinate axes, reflects a sight image onto a screen of an optical weapon sight. Four linear electrodynamic motors, two for each tilt axis, control mirror positioning. The motors are on said axes, equidistant from their intersection, and spaced far enough from that intersection so that a mirror position transducer can be located between them, under the gimbal mounting. The transducer comprises a soft iron rotor carried by the mirror, a central core wound with an a.c.-energized exciter coil, and four outer cores that are positioned like the motors and each wound with a secondary coil.

8 Claims, 16 Drawing Figures

OPTICAL WEAPON SIGHT HAVING CONTROLLED UNIVERSALLY MOVEABLE MIRROR

This invention relates to optical weapon sighting devices and is more particularly concerned with means whereby a moveable mirror that is associated with such a device and which reflects a sighting symbol image onto a viewing screen of the device can be tilted to and maintained in a desired orientation at which the sighting symbol image is adjustingly positioned on the screen in accordance with ascertained conditions that affect aiming.

An optical sight of the type to which the present invention relates is typically installed in an attack aircraft. The pilot of such an aircraft has before him a half-silvered mirror through which he can see outside the airplane and on which there is projected the luminous image of a sighting symbol such as a reticle, crosshairs or the like. The pilot uses the sighting symbol image to align his aircraft upon a target to be attacked and to maneuver the aircraft to the proper position and attitude to effect a hit upon the target. The optical sight is useful for the release of bombs, the firing of guns and the discharge of air-to-air and air-to-surface missiles.

Under many tactical conditions the aiming line defined by the sight symbol image must be displaced from parallelism with the longtudinal centerline of the aircraft. Thus, in attacking a target at any substantial distance from the aircraft the sight symbol image may have to be depressed from parallelism with the longitudinal centerline of the aircraft to compensate for the effect of gravity upon the released weapon or missile as it moves in its trajectory. Or in bombing in a crosswind, the sight symbol image may be displaced to left or to right of its centerline position, to compensate for drift. Usually the magnitudes of the quantities that control such displacement of the sight symbol image are known or can be more or less readily ascertained or estimated, and it is therefore possible to calculate the amount by which the sight symbol image should be displaced from centerline to compensate for such conditions.

Both the sight symbol image generating means and the viewing screen are usually fixed with respect to the aircraft, and adjusting movement of the image on the screen is effected by means of a mirror which is gimbal mounted for universal tilting motion about a pair of coordinate axes and which reflects the image onto the screen.

Heretofore the usual apparatus for effecting adjustment of the mirror has comprised gyro means connected with the mirror through a mechanical motion transmitting arrangement. Since the optical sight apparatus is located in the pilot's field of forward view, its mechanical parts must be very compact to present the least possible obstruction to his vision. The gyro actuator means had to be carefully designed to achieve even reasonable compactness. The difficulty of affording a satisfactory connection between the mirror and the gyro means was further complicated by the need for eliminating all loose play in the motion transmitting connections and at the same time keeping friction to a negligible minimum. Obviously the presence of either friction or loose play would be detrimental to accuracy of mirror positioning and would also give rise to wear that would necessitate frequent service and replacement of parts.

The prior arrangement also had the disadvantage that it required complex apparatus for producing a feedback that corresponded to the position of the mirror. Such a feedback is essential to precise control of mirror orientation.

Since both the offensive and defensive capabilities of a weapons system comprising an optical sight are heavily dependent upon the accuracy and reliability of the sight apparatus, the general object of the present invention is to provide very compact, simple and highly reliable apparatus for adjusting the movably mounted mirror in such a sight.

More specifically, it is an object of this invention to provide apparatus for moving such a mirror to any required position of tilting adjustment, and for holding it in any such position to which it may be moved, which apparatus is in itself compact and can be located in zones where adequate space for it is readily available, and, further, comprises no parts that have friction-producing engagement with one another other than the joints of the gimbal mounting for the mirror.

It is also an object of this invention to provide very simple and compact feedback means for producing a continuous output that corresponds to the position of adjustment of the gimbal mounted mirror of an optical sight, which feedback means is well adapted for cooperation with the mirror adjusting and positioning means of this invention and, like it, has no parts that can have friction producing engagement with one another.

In general, the above stated objects of the invention are achieved, in a preferred embodiment of the invention, with a gimbal mounting for the mirror by which it is tiltable about either or both of a pair of perpendicular coplanar tilt axes; four linear electrodynamic motors that are equidistant from the intersection of said tilt axes and are connected between a fixed frame and edge portions of the mirror, two on each tilt axis, at oppoosite sides of the intersection of those axes, each of said motors having its axis normal to the plane containing the tilt axes; and a feedback device comprising a magnetically permeable rotor on the mirror that projects to one side thereof and cooperates with five column-like magnetically permeable core members that have their axes parallel to one another and perpendicular to the plane containing the tilt axes, a central one of said core members having its axis intersecting the intersection of the tilt axes and having around it an exciter coil energizable with a.c., and each of the other core members having its axis intersecting one of the tilt axes and having around it a detector coil.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of an embodiment of the invention constructed according to the best mode so far devised for the practical application of the principles thereof, and is which:

Figure 1:
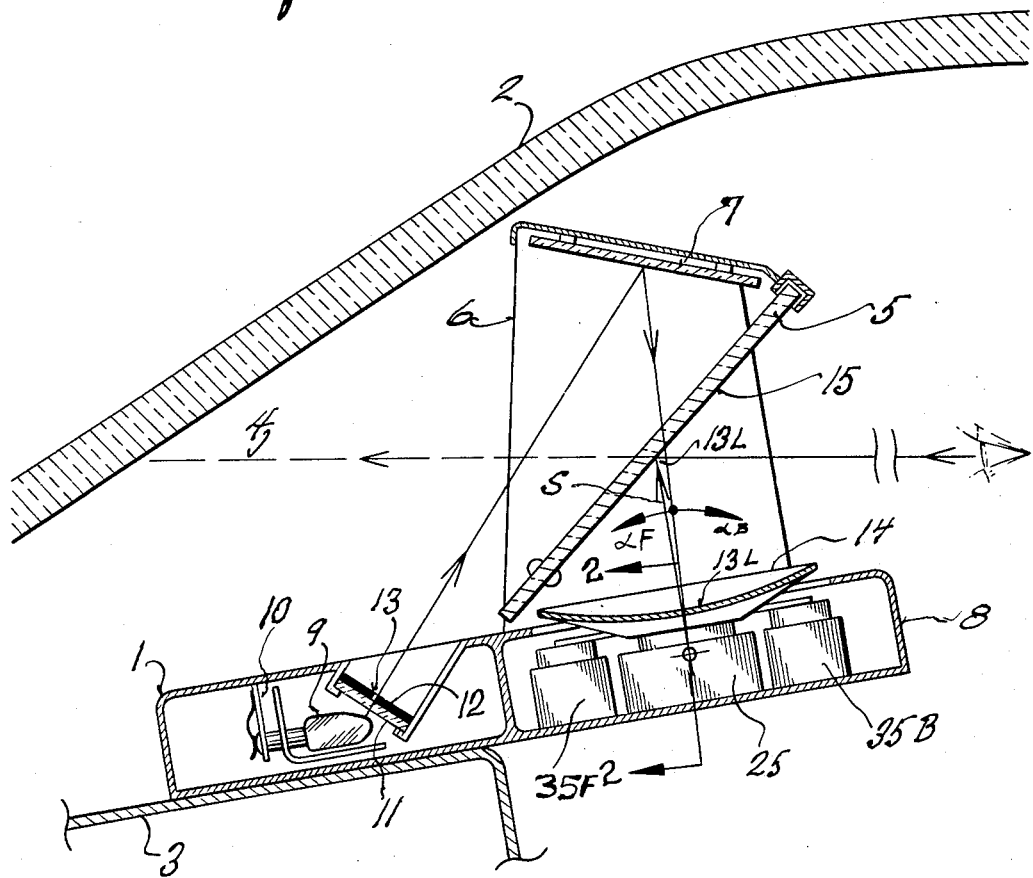
FIG. 1 is a view in vertical section through an optical weapon sight embodying the principles of this invention, shown installed in an aircraft cockpit.
Figure 2:
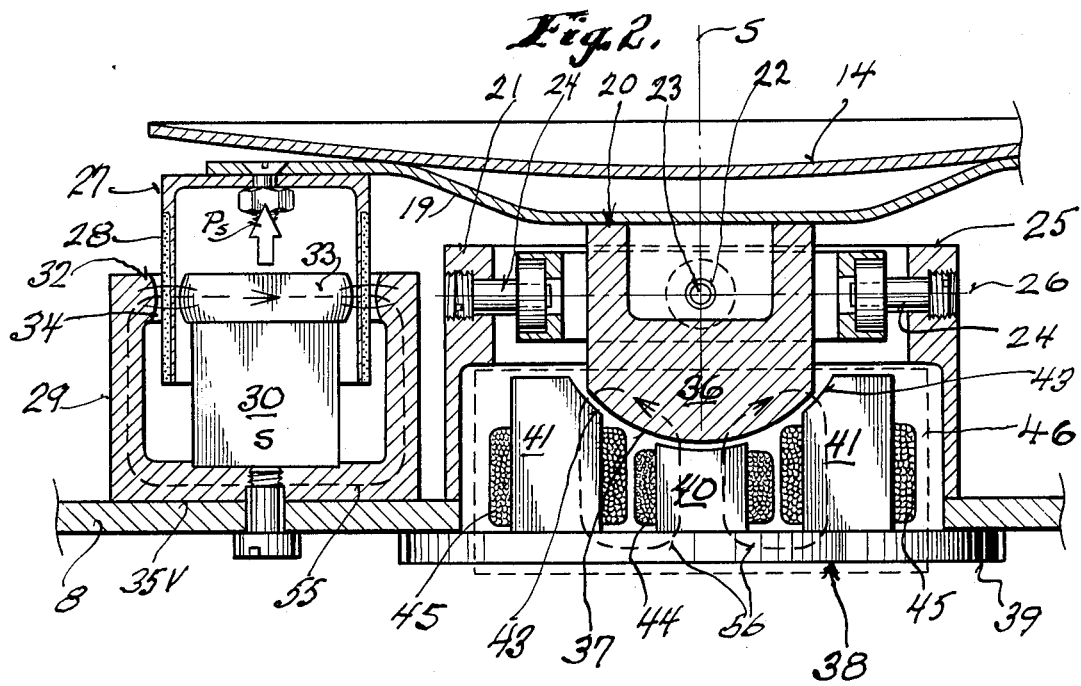
FIG. 2 is a fragmentary vertical sectional view through the moveable mirror of the optical sight, its gimbal mounting, one of the linear electrodynamic motors that actuates it for tilting motion, and the feedback apparatus associated with it.

Referring now more particularly to the accompanying drawings, the numeral 1 designates generally an optical weapon sight embodying the principles of this invention, illustrated in FIG. 1 as installed in the cockpit of an airplane, within the field of view of the pilot and just behind a windshield 2. The sight apparatus is thus positioned on top of the aircraft instrument panel 3, and may project a distance behind the panel.

The fixed structure of the sight apparatus comprises a frame 8, which is mounted on top of the instrument panel, and a bracket 6 that projects up from the frame and supports at its top a fixed flat mirror 7 that is oriented substantially horizontally and a half-silvered mirror 5 that extends obliquely downwardly and forwardly from the rear edge of the flat mirror.

The front portion of the frame comprises a housing in which there is a fixed sight symbol image generating means comprising a lamp 9 and a reflector 10 by which light from the lamp is concentrated and beamed obliquely rearwardly and upwardly, through a transparent glass 11 and a reticle 12. The reticle has in it a slit 13 of suitable configuration to define a sighting symbol. The image of the sighting symbol is projected from the reticle rearwardly and upwardly onto the flat mirror 7, which reflects downwardly.

The half-silvered mirror 5 extends obliquely across the line of the pilot's vision and also across and beneath the flat mirror 7. Light can pass through the half-silvered mirror from in front of it, so that the pilot can see through it; but light falling onto its rear surface 15 is reflected by it so that it can serve as a screen upon which the sight symbol image is projected.

The light rays carrying the sight symbol image, reflected from the flat mirror 7, thus pass downwardly through the half-silvered mirror 5 onto a moveable concavely spherical mirror 14 below the half-silvered mirror. From the moveable mirror 14 the image is reflected up onto the rear surface 15 of the half-silvered mirror, and, by reflection from the latter, is visible to the pilot, appearing to be superimposed upon his view through the windshield 2. The sight symbol image 13L on the half-silvered mirror defines an aiming line 4.

The mirror 14 is gimbal mounted and is controlled in its tilting motion about the gimbal axes in accordance with the outputs from computing means 16 (see FIG. 3) connected with gyro means 17 and 18. Tilting of the mirror 14 of course moves the sight symbol image 13L across the half-silvered mirror or viewing screed 5, to effect displacement of the image to or from a position at which the aiming line 4 that it defines is parallel with the longitudinal centerline (X axis) of the aircraft. The image 13L occupies that centerline position on the screen when the mirror 14 is in a neutral position in which its optical axis S is in the position designated by N in FIG. 3.

Figure 9:
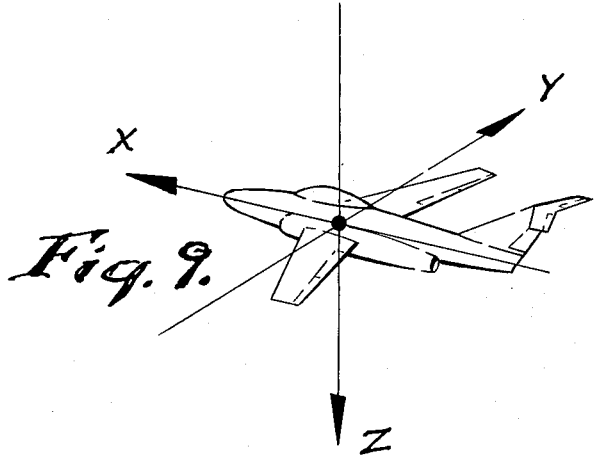
FIG. 9 is a perspective view of an airplane illustrating its three principal axes, as referred to hereinafter.

The gimbal mounting of the mirror 14 enables it to have universal tilting motion about either or both of two axes 23 and 26 which would ordinarily be parallel, respectively, to the longitudinal or X axis of the airplane and to its lateral or pitching axis Y. As shown in FIG. 9, the aircraft also has a vertical or yaw axis Z that is referred to hereinafter.

The gimbal mounting for the mirror comprises a stationary annular gimbal frame member 25 that is fixed on the frame 8. Concentrically disposed inside the gimbal frame member is a gimbal ring 21 which is tiltably carried from the frame member on diametrically opposite, coaxial ball bearing trunnion pins 24, so that the gimbal ring is free to tilt about the axis 26 that is parallel to the Y axis of the aircraft.

A dish-shaped mounting plate 19 is secured to the rear surface of the mirror. Secured, in turn, to the mounting plate 19 is a central gimbal member 20 that projects away from the mirror and has a pivotal connection with the gimbal ring 21, provided by other coaxial ball bearing trunnion pins 22. The axis 23 of the trunnion pins 22, which is parallel to the X axis of the aircraft, is perpendicular to and intersects the axis 26 of the trunnion pins 24, so that those two tilt axes define a plane. The circular edge of the mirror 14 lies in a plane that is parallel to the plane containing the tilt axes.

The gyro means 17 and 18, which sense changes in the attitude of the aircraft in the XZ and XY planes, respectively, can be located remotely from the optical sight apparatus, anywhere in the aircraft, inasmuch as they provide only a control signal output and have no mechanical connection with the moveable mirror. Instead, four reversible linear electrodynamic motors 35F, 35B, 35V, 35H serve to tilt the moveable mirror and to hold it in any required position of tilting adjustment.

Each of the reversible linear electrodynamic motors comprises in general, a cup-shaped inner member 27 that has a coil 28 wound around it, a cup-shaped outer member 29 of soft iron, and a central cylindrical core member 30 that comprises a permanent magnet. The three members just mentioned are concentric with one another and have their coinciding axes normal to the plane that contains the tilt axes 23 and 26. As shown, the cup-shaped inner member 27 is rigidly secured to the mirror mounting plate 19 and opens downwardly, while the outer cup-shaped member 29 is rigidly secured to the bottom of the frame 8 and opens upwardly.

The permanent magnet core member 30, which is fixed within the outer cup-shaped member 29, is preferably cylindrical and is magnetized in its axial direction, to have poles at its opposite ends. Its lower end is flatwise engaged with the end wall of the outer cup-shaped member 29, so that there is a magnetic flux circuit 55 through that cup-shaped member and the permanent magnet. On the upper end of the permanent magnet member 30 there is a concentric, disk-like soft iron pole shoe 31, having a diameter somewhat larger than that of the magnet member. The radially projecting edge portion of the pole shoe has a convexly rounded surface 33. Around the inner rim of the soft iron outer cup-shaped member 29 there extends a radially inwardly projecting land or ledge 32 having a convexly rounded radially inner surface that opposes the similarly rounded surface 33 on the pole shoe and cooperates therewith in defining an annular air gap 34 in the magnetic circuit 55. Note that this air gap has its smallest width on the plane containing the tilt axes 23, 26.

The cylindrical side wall of the inner cup-shaped member 27 comprises a sleeve that is received in the annular air gap 34, and its thickness (as measured radially) is such that there is some clearance between it and the surfaces that define the air gap 34, to accommodate its components of lateral motion that attend swinging of the mirror 14. The coil 28 around the inner cup-shaped member, which extends a substantial distance axially along that member, is received in a reduced diameter portion of its side wall, to provide, in effect, a smooth outer surface for the whole of that side wall.

Figure 8:
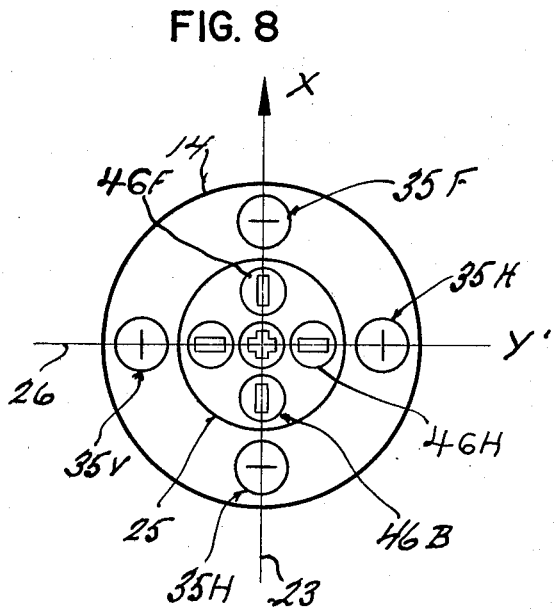
FIG. 8 is a more or less diagrammatic view from the underside of the moveable mirror showing the positions of the mirror, the mirror actuating means and the mirror position transducer, in their relationships to one another.

As best seen in FIG. 8, the axes of the four linear electrodynamic motors 35F, 35B, 35V, 35H are equidistant from the intersection of the tilt axes 23 and 26, and each motor has its axis intersecting one of the tilt axes. Thus the motors are arranged in pairs, each pair of motors providing for tilting of the mirror 14 about one of the axes 23, 26, the motors of each pair being spaced equal distances to opposite sides of their tilt axis. The motors are connected with the dished mounting plate 19 near the edge thereof, and are thus spaced substantial distances from the intersection of the tilt axes so that there is ample room between the motors for the gimbal frame member 25 and for a mirror position transducer (described below) which is housed within the embrace of that frame member.

The central gimbal member 20, which projects downwardly from the mounting plate 19, through and well beyond the plane containing the tilt axes 23, 26, is made of soft iron and thus has a substantial amount of weight and leverage to serve as a counterweight by which the mirror is balanced. Its lower portion 36 also serves as a rotor or moveable element of the mirror position transducer, and for that purpose its bottom surface is spherically rounded on a uniform radius about the intersection of the tilt axes.

The position transducer, which produces feedback signals corresponding to the orientation of the moveable mirror, also comprises a soft iron frame consisting of a base plate 38 that can be removably secured to the underside of the frame 8, in the manner of a cover, and five column-like core members 40, 41 that project upwardly from the base plate. The core members are cylindrical, each having its axis normal to the plane containing the tilt axes 23, 26, and they are arranged in a group consisting of a central core member 40 and four outer core members 41.

The axis of the central core member 40 extends through the intersection of the tilt axes 23, 26. As with the above described linear motors, the axes of the several outer core members 41 are equidistant from the intersection of the tilt axes, each intersecting one of the tilt axes. Thus the outer core members are arranged in pairs, one pair for each of the tilt axes, with the two members of the pair for each tilt axis spaced to opposite sides of that axis.

Around the central core member 40 there is wound a primary coil 44 that is intended to be energized with alternating current so that the central core member and its coil comprise an exciter. Around each of the outer core members 41 there is wound a secondary coil 45F, 45B, 45V, 45H, so that the outer core members with their coils comprise detectors 46F, 46B, 46V, 46H, respectively.

The upper ends of the several core members 40 and 41 are spherically concave, being rounded concentrically with the spherically convex bottom surface of the rotor 36. Hence the opposing surfaces of the core members and of the rotor define air gaps which are of uniform width, as measured along radii from the intersection of the swinging axes. However, when the moveable mirror is in its neutral position, the spherical surface of the rotor opposes only a part of the concavely spherical upper surface of each outer core member 41, so that any tilting of the mirror out of that position, about either of the tilt axes, changes the relative areas of the air gaps between the rotor and the two outer core members 41 at opposite sides of that axis. Since the area of the air gap between the rotor and the central core member 40 remains constant in all positions of tilting motion of the mirror, such change in the areas of the air gaps in the magnetic circuits of a pair of detectors results in a change in inductive coupling between the exciter and those detectors. Hence, when a steadily and uniformly alternating exciting current is caused to flow through the primary coil 44, the alternating voltages induced in the several secondary coils will accurately signify the orientation of the moveable mirror.

Figure 3:
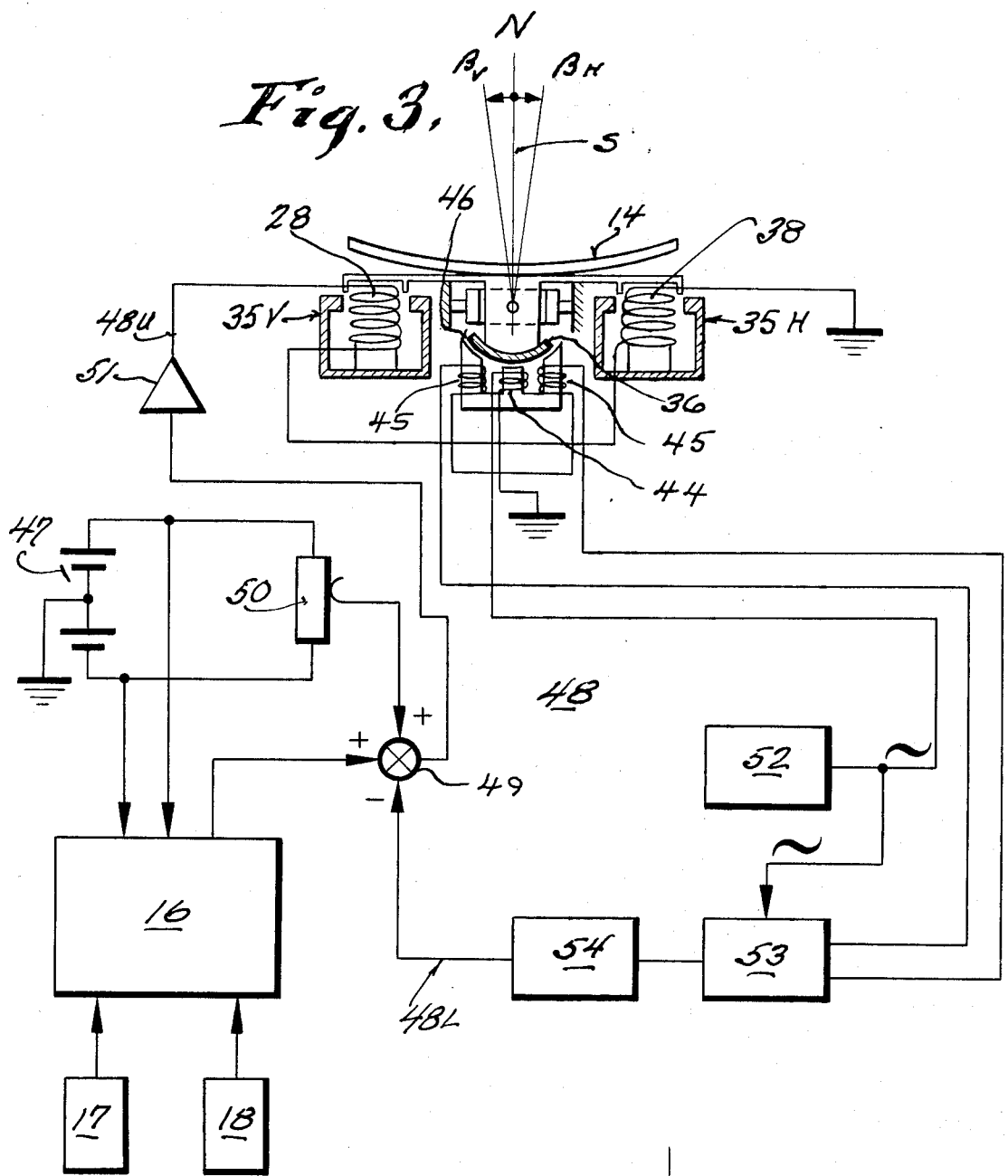
FIG. 3 is a more or less diagrammatic view of the mirror actuating apparatus and mirror position transducer, shown in their connections to a control circuit for adjustingly positioning the mirror.

In the operation of the apparatus, the computer device 16 constantly issues demand value signals that depend upon the values of quantities that affect aim. Such values are fed into the computer in a known manner, as signals from various sensors carried by the aircraft, including the gyros 17 and 18 which serve as attitude angular rate sensors. The computer 16 issues one demand value signal that corresponds to a required displacement $\alpha F$ or $\alpha B$ of the moveable mirror from its neutral position about the axis 23, and issues another demand value signal that corresponds to the required similar displacement $\beta_V$ or $\beta_H$ about the axis 26. FIG. 3 illustrates the circuit 48 by which only one of the demand value signals is processed, to control tilting of the mirror about the axis 26, but it will be understood that there is a similar circuit for the other demand value signal, to control tilting about the axis 23. The illustrated circuit comprises a position feedback circuit 48L in which the detectors 46V and 46H of the transducer are connected and a control circuit 48U in which the linear motors 35V and 35H are connected. The circuits 48L and 48U are connected with one another at a summation point 49 and are energized from a current source 47.

The demand value signal from the computer 16 is fed to the summation point 49, where it may be modified by a feedback signal from the feedback circuit 48L, so that the output of the summation point, fed to the circuit 48U, constitutes a control signal. The control signal is amplified by a power amplifier 51, and the amplified control signal is applied to the coils 28 of the linear electrodynamic motors 35V and 35H that establish and maintain the $\beta_V$ and $\beta_H$ displacement of the mirror 14 about the axis 26. The coils 38 of those two motors are wound in opposite directions and are connected in series. The amplified control signal current flowing in each coil reacts with its associated magnetic field 55 to produce a linear force $P_S$ that tends to tilt the mirror about the axis 26, the direction and magnitude of such tilting force being dependent upon the direction and magnitude of the amplified control current.

Figure 4:
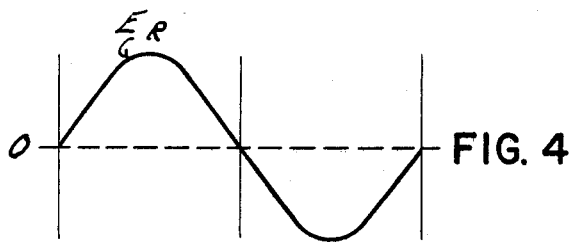
FIGS. 4–7d are graphs illustrating the wave forms of various input and output signals generated in the circuit diagrammed in FIG. 3.

The tilting of the mirror that is effected by the motors 35V, 35H in cooperation with one another, and which may carry the mirror to or from its neutral position through an angle $\beta_V$ or $\beta_H$, is sensed by detectors 46V and 46H of the position transducer, which are connected in the feedback circuit 48L. For energizing the feedback circuit there is an oscillator 52 that produces an alternating voltage which is fed to the coil 44 of the transducer exciter and is also fed to a phase sensitive demodulator 53. The output of the oscillator 52 is preferably a true sine wave of a constant relatively high frequency (e.g., 1,200 Hz), as depicted by $E_p$ in FIG. 4.

Figure 5A:
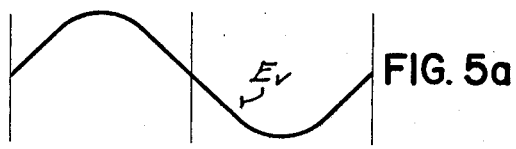
Figure 5B:
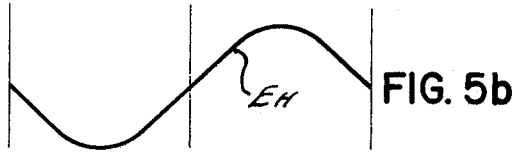

As explained above, the voltage induced in each of the secondary coils of the position transcucer depends upon the inductive coupling of the primary coil with the respective secondary coils, as established by the orientation of the mirror. With the mirror in its neutral position of tilting about the axis 23, the voltage $E_V$ induced across the coil of detector 46V will be as depicted in FIG. 5a, and a voltage $E_H$ of equal magnitude but of opposite phase will be induced across the coil of detector 46H as depicted in FIG. 5b. Because the coils of detectors 46V and 46H are connected in series but wound oppositely to one another, their net output, fed to the phase sensitive demodulator 53, will then be zero.

Figure 6A:
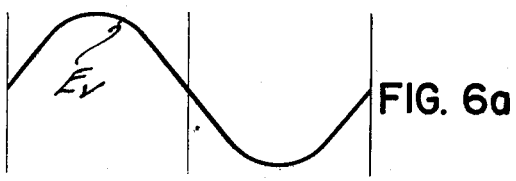
Figure 6B:
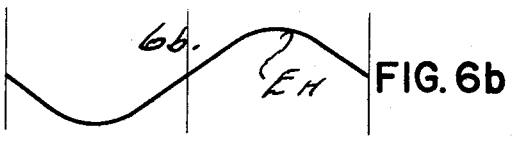
Figure 6C:
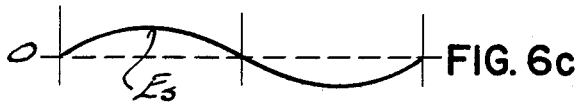

If the mirror is tilted about the axis 23, out of its neutral position and to an angle $\beta_V$, there will be an increased voltage $E_V$ across the coil of detector 46V and a correspondingly decreased counter-phase voltage $E_H$ across the coil of detector 46H, as respectively depicted by FIGS. 6a and 6b, considered in comparison with FIGS. 5a and 5b, respectively. The net output of the two detector coils, fed to the phase sensitive demodulator 53, is then a difference voltage $E_S$ as depicted in FIG. 6c, the magnitude of which depends upon the amount by which the mirror 14 is displaced from its neutral position.

Figure 7A:
Figure 7B:
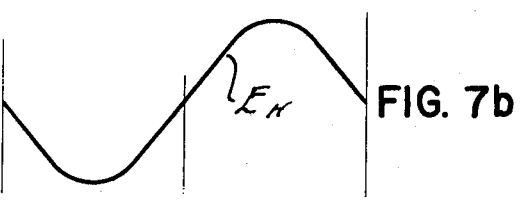
Figure 7C:
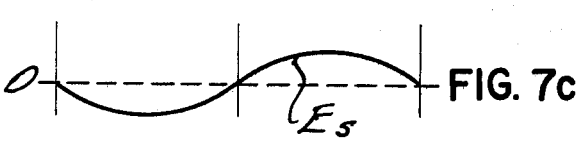

If the mirror is tilted out of its neutral position in the opposite direction, through an angle $\beta_H$, the respective voltages $E_V$ and $E_H$ induced across detectors 46V and 46H will be as illustrated in FIGS. 7a and 7b, and the net difference voltage $E_S$ across the two of them will be as depicted in FIG. 7c.

Thus the phase relationship between the alternating difference voltage $E_S$ and the output of the oscillator will depend upon the direction of tilting of the mirror 14.

Figure 6D:
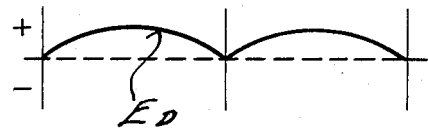
Figure 7D:
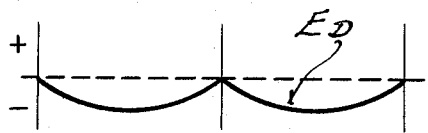

In the phase sensitive demodulator the difference voltage $E_S$ is compared with the output voltage of the oscillator and is transformed into a full-wave rectified signal voltage $E_D$ of the sign corresponding to the direction of mirror displacement and having a magnitude corresponding to that of the difference voltage $E_S$. FIG. 6d depicts the rectified voltage $E_D$ that corresponds to the alternating voltage $E_S$ of FIG. 6c, and FIG 7d bears a similar relationship to FIG. 7c.

The rectified signal voltage is passed through a stabilizing filter 54 and, as filtered, is fed to the summation point 49, to modify the demand signal output from the computer means 16 and thus produce the control signal.

Under certain conditions it is desirable to fix the mirror 14 in some orientation other than its neutral position, as for bombing with a so-called dumped sighting line, or for bombing with a cross wind that requires a known drift correction. For such purposes the computer means 16, as well as the gyro means 17 and 18, can be disconnected from the summation point 49, and a demand value signal can be fed into the summation point from a manually adjustable rheostat 50 connected with the d.c. current source 47. When the demand value signal is taken from the computer, the rheostat 50 is normally set in a neutral position at which its output to the summation point 49 is zero.

From the foregoing description taken with the accompanying drawings it will be apparent that this invention provides an optical weapon sight that is compact overall, can cooperate with gyros that can be mounted at any convenient location, and is very accurate and reliable because its only components that can develop friction or loose play are the gimbal joints that mount its moveable mirror for tilting motion.

Those skilled in the art will appreciate that the invention can be embodied in forms other than as herein disclosed for purposes of illustration.

The invention is defined by the following claims:

1. An optical sight device for weapon aiming, comprising a fixed frame that carries a viewing screen, means fixed on the frame for generating a sighting symbol image which is to be visible on the screen and to be used as an aiming reference, a mirror which reflects the sighting symbol image onto the screen and which is constrained to universal tilting about a pair of perpendicular coplanar tilt axes, and demand signal means for producing outputs signifying the magnitude and direction of displacement of the mirror about each of said axes that will so orient the mirror that the sighting symbol is positioned on the screen in accordance with conditions that affect aiming, said optical sight being characterized by:

A. two pairs of reversible linear motors, one pair for tilting the mirror about each of said tilt axes,
      1. each of said motors being connected between the frame and the mirror to react between them,
      2. the two motors of each pair being located
         a. substantial and equal distances to opposite sides of the intersection of the tilt axes, and
         b. on one of said axes;
   B. position transducer means for producing an output that corresponds to the angular orientation of the mirror about each of said tilt axes, said position transducer means comprising
      1. an exciter element spaced to one side of the plane containing the tilt axes and located on a perpendicular to said plane that extends through the intersection of said axes,
      2. two pairs of fixed detector elements, one pair for each of said tilt axes, the two detector elements of each pair thereof being spaced equal distances to opposite sides of the plane that contains said perpendicular and their tilt axis and being located on the plane that contains said perpendicular and the other tilt axis, and
      3. an element at said one side of the first mentioned plane, constrained to move in unison with the mirror and having portions in opposing relationship to the exciter element and normally in partial opposing relationship to all of said detector elements to vary an electrical characteristic of a circuit comprising each pair of detector elements in accordance with the orientation of the mirror; and C. circuit means connected with said demand signal means and connected in feedback relationship with said position transducer means for producing control outputs for the linear motors that correspond in magnitude and sign with any departure of the mirror from an orientation signified by the output of the demand signal means and for feeding said control outputs to the linear motors to cause them to maintain the mirror in the last mentioned orientation.

2. The optical sight device of claim 1 wherein each of said reversible linear motors comprises:
 1. permanent magnet means comprising concentric inner and outer magnetically permeable members connected in magnetic circuit with one another and defining an annular air gap across which there is a magnetic field;
 2. electrically energizable magnet means comprising a tubular winding that is co-axially receivable in said air gap and has substantial axial length;
 3. means fixing one of said magnet means on the frame; and
 4. means providing a motion transmitting connection between the other of said magnet means and the mirror.

3. The optical sight device of claim 1, further characterized by:
 1. said exciter element of the position transducer means comprising
  a. a magnetically permeable core concentric with said perpendicular, and
  b. an exciter winding energizable with alternating current and arranged in flux linking relation with said core;
 2. each of said detector elements comprising
  a. another magnetically permeable core which has its axis parallel to said perpendicular and which is spaced from the first mentioned core, and
  b. a detector winding in flux linking relation to said other core and in which an alternating current is adapted to be induced; and
 3. said element constrained to move with the mirror comprising a magnetically permeable member which has a convexly spherical surface that coacts with the first mentioned core to define therewith an air gap that is of constant size in all positions of the mirror, and which coacts with surface portions on each of said other cores to define therewith an air gap that varies in area in accordance with orientation of the mirror, said surface portions on the other cores being concavely spherical, concentric with said convexly spherical surface, and opposing the same.

4. In an optical sight for weapon aiming having stationary structure comprising means for generating a sighting symbol image and a viewing screen onto which the sighting symbol image is reflected, and having a mirror which reflects the sighting symbol image onto the screen and which is mounted for universal tilting motion relative to the stationary structure about a pair of intersecting perpendicular tilt axes, actuating means for tilting the mirror in accordance with electrical outputs that correspond to the amount and direction of tilting of the mirror out of a normal position about each tilt axis that is required for positioning the sighting symbol image on the screen to accommodate conditions that affect aiming, said actuating means comprising:

A. two pairs of reversible linear motors, one pair for tilting the mirror about each of said tile axes, each of said motors comprising an inner sleeve member, a magnetically permeable outer sleeve member, and a permanent magnet,
 1. the inner sleeve member
  a. having a coil around it which extends a substantial distance axially along it and
  b. being telescopingly coaxially receivable in the outer sleeve member,
 2. the outer sleeve member and the permanent magnet
  a. being in fixed coaxial relation to one another and
  b. being magnetically connected at one end of the outer sleeve member to define a magnetic circuit which includes an annular air gap near the other end of the outer sleeve member wherein the inner sleeve member is receivable;
B. each of said motors being arranged to react between the fixed structure and the mirror, with its axis substantially perpendicular to the plane containing the tilt axes, and with
 1. one of said sleeve members of the motor connected with the mirror to move in unison therewith, and
 2. the other sleeve member fixed to the stationary structure; and
C. the pair of motors for each tilt axis being located
 1. with their axes substantially in a plane which contains the other tilt axis, and
 2. equal and substantial distances to opposite sides of their tilt axis so that a position transducer responsive to the tilting orientation of the mirror can be accommodated between them.

5. In apparatus comprising a tiltable element which is carried by a fixed element for tilting relative to the latter in opposite directions about a defined tilt axis, and demand signal means for generating a demand electrical signal that signifies a required position of tilt of the tiltable element, means for maintaining the tiltable element in the position of tilt signified by the demand signal, the last mentioned means comprising:

A. a pair of permanent magnet members on one of said elements, spaced equal distances to opposite sides of said tilt axis, each of said permanent magnet members comprising concentric inner and outer magnetic parts, one of which comprises a permanent magnet, said inner and outer magnetic parts being connected in a magnetic circuit with one another and cooperating to define an annular air gap which is in said magnetic circuit and which has its axis extending substantially in said directions;
B. a pair of substantially tubular electrically energizable magnet means on the other of said elements, there being one of said electrically energizable magnet means for each of said permanent magnet members and each being coaxially received in the annular air gap of its permanent magnet member for axial motion relative to the latter;

C. detector means for producing a signal which corresponds to the existing position of tilt of the tiltable element, said detector means comprising fixed and movable parts which are respectively carried by said fixed and tiltable elements; and D. control output means connected with the demand signal means and in feedback relation with the detector means, for producing a control output which is fed to the electrically energizable magnet means and which corresponds to the magnitude and direction of any departure of the existing position of tilt of the tiltable element from that signified by the demand signal.

6. The apparatus of claim 5, further characterized by:
1. the outer part of each of said permanent magnet members being substantially cup-shaped, with a substantially cylindrical side wall and an end wall;
2. the inner part of each of said permanent magnet members being substantially cylindrical and
   a. having a diameter substantially smaller than the inside diameter of said side wall,
   b. having one end engaged with said end wall, and
   c. having its other end substantially flush with the rim of said side wall;
3. said side wall having on its inner surface, adjacent to its rim, a radially inwardly projecting convexly rounded circumferential land; and
4. said inner part having adjacent to its said other end a radially outwardly projecting convexly rounded circumferential land which is radially opposite the first mentioned land and cooperates with the same to define said air gap.

7. The apparatus of claim 6 wherein said inner cylindrical part comprises a permanent magnet and is magnetized in its axial direction.

8. The apparatus of claim 5 wherein said fixed and movable parts of the detector means are located between said permanent magnet members.

* * * * *